United States Patent [19]
Lemelson

[11] Patent Number: 5,228,112
[45] Date of Patent: Jul. 13, 1993

[54] INSPECTION CONTROL SYSTEM AND METHOD

[76] Inventor: Jerome H. Lemelson, 868 Tyner Way, Call Box 14-286, Incline Village, Nev. 89450

[21] Appl. No.: 587,549

[22] Filed: Sep. 21, 1990

Related U.S. Application Data

[63] Continuation of Ser. No. 65,380, Jun. 23, 1987, abandoned, which is a continuation-in-part of Ser. No. 240,569, Mar. 4, 1981, abandoned, which is a continuation-in-part of Ser. No. 13,608, Feb. 16, 1979, Pat. No. 4,338,626.

[51] Int. Cl.$^5$ .......................... G10L 5/00; G06K 9/00; G06F 12/00
[52] U.S. Cl. .......................................... 395/2; 382/6; 395/650; 381/110; 381/43; 381/42; 358/140; 364/281.3
[58] Field of Search .................... 381/42, 43; 395/2

Primary Examiner—Emanuel S. Kemeny
Attorney, Agent, or Firm—Steven G. Lisa

[57] ABSTRACT

A system and method are described for automatic analysis of image information, such as dimensional, surface, internal or other information. Analysis is controlled by the electronic analysis of speech signals generated by an operator or by a combination of speech generated signals and devices such as switches and variable potentiometers, capacitors or inductors. Electronic computers are employed to analyze the operator's speech signals and to generate control signals. The speech analyzing and control computer is operable to effect the selective operation of recorders of information entered and derived, the relative positioning of the specimen and a sensor, sensors to permit the selective scanning of the field, the initiation of the scanning, the positioning of the scanning device, the intensity of the image of the scanning field, the selection of specimens from storage, the movement of the scanning device about one or more axes, analysis to be performed with respect to information derived from scanning, auxiliary apparatus operation, and other functions. The results of certain or all of the inspection functions may also be presented by means of electronically generated speech which may be automatically presented in response to speech commands of the operator.

26 Claims, 1 Drawing Sheet

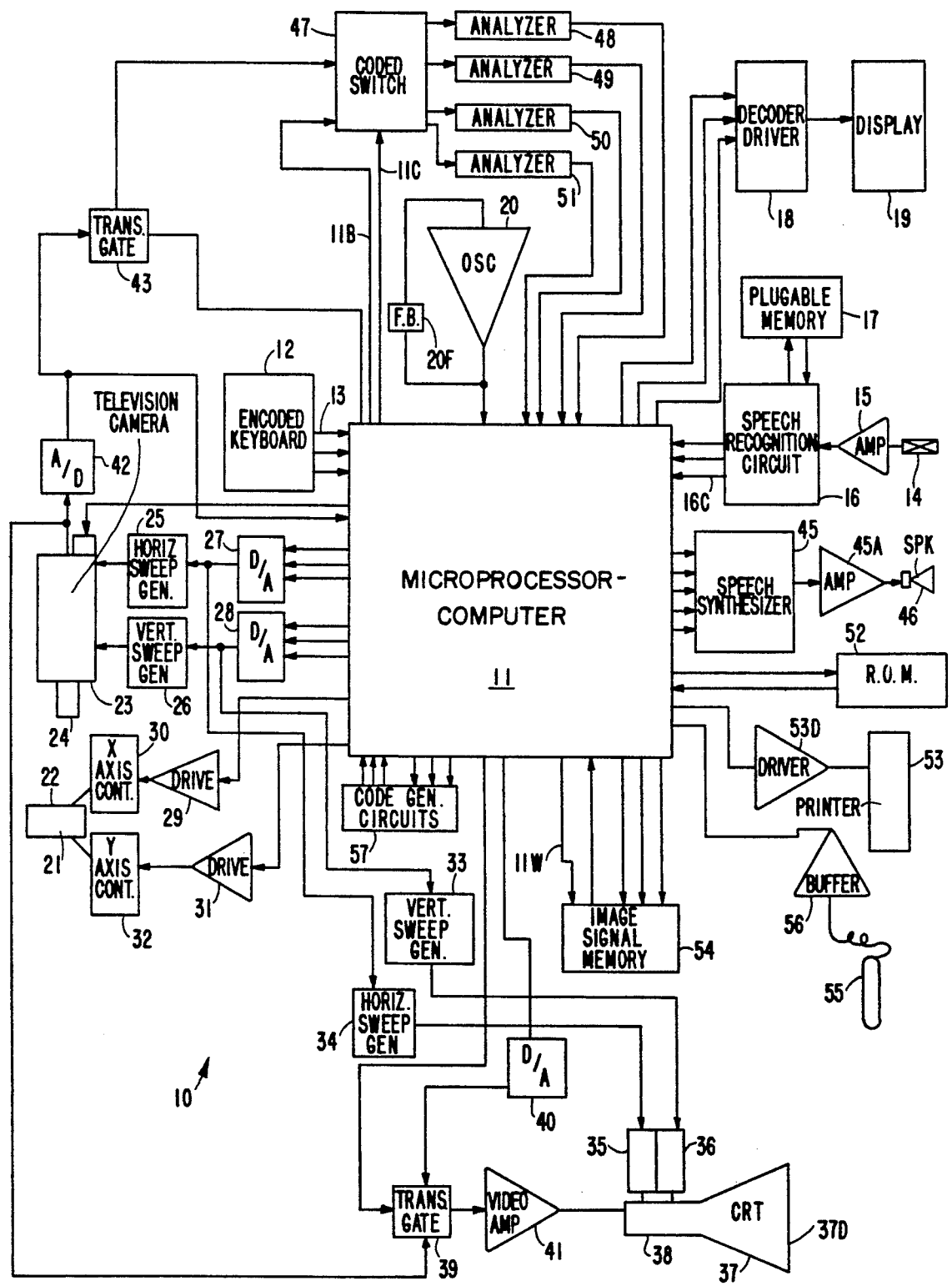

INSPECTION CONTROL SYSTEM AND METHOD

RELATED APPLICATIONS

This a continuation of application Ser. No. 07/065,380, filed Jun. 23, 1987, now abandoned, which is a continuation-in-part of application Ser. No. 06/240,569, filed Mar. 4, 1981, now abandoned, which is a continuation-in-part of application Ser. No. 06/013,608, filed Feb. 16, 1979 now U.S. Pat. No. 4,338,626 issued Jul. 6, 1982.

SUMMARY OF THE INVENTION

This invention relates to an apparatus and method for effecting automatic image analysis of articles of manufacture, various forms of matter such as raw material, biological specimens, and the like, aerial photographs, graphics and drawings, etc. In particular, the invention is concerned with a system and method for effecting such automatic analysis wherein the efficiency of an operator of image analysis apparatus is substantially improved by interfacing with a computer controlling the analysis using both manual and voice signal responsive techniques. In a preferred form, electronically generated synthetic speech is also employed to improve the operation of the system and provide a method wherein efficiency of operation is improved and the time required to effect a particular analyzing function or operation is substantially reduced.

In the operation of automatic image analyzing systems of the type provided in my above mentioned patent application, Ser. No. 013,608, now U.S. Pat. No. 4,338,626, various image analyzing functions are effected or initiated by the operation of manually operated switches and other control devices. A bank of switches or keyboard may be utilized, for example, to perform such operations as initiate analyzing beam scanning, set up and select a scanning control cycle, position a specimen with respect to the scanning or sensing field of the television camera employed, select a particular analyzing circuit to be utilized in the analysis, variably adjust the intensity of the image viewing field, control and adjust the operation of the scanner or camera and the monitor on which the image being analyzed is generated and other functions associated with the automatic or semi-automatic image analysis function. These manually initiated and controlled functions require considerable time on the part of an operator and may be distracting to the operator in performing specific analyzing functions, if not a means for interrupting the analysis in a manner to consume time and thereby increase the time required to effect a particular analyzing function.

The instant invention is directed to a system wherein either all functions associated with automatic image analysis and the operation of the equipment effecting same, is automatically effected in response to command control signals generated by the operator's speech or a combination of such speech generated command control signals and signals generated by manually operated means including switches and variable resistors, capacitors and inductors. Combined with such switched operation may also be the manual operation of a so-called light pen or other device adapted to control image scanning and enhancement.

Accordingly it is a primary object of the invention to provide a new and improved system and method for effecting image analysis.

Another object is to provide an apparatus and method for automatically analyzing image fields wherein an operator's efficiency is substantially increased and the time required to effect specific analyzing functions is reduced.

Another object is to provide an electronic image analyzing system in which both manual and voice controlled electronic means are employed to perform and properly effect automatic image analyzing functions.

Another object is to provide a system and method for predeterminately and selectively controlling the operation of an electronic system employing a viewing screen such as a cathode ray tube and the generation of a still image therein requiring analysis of at least part of its content.

Another object is to provide a system and method for automatically controlling the deflection and location of a radiation beam in a field under analysis.

Another object is to provide a system and method for automatically controlling the deflection and scanning of a radiation beam for the purpose of generating images.

Another object is to provide a system and method for effecting selected relative positioning between a scanning device and an article or matter under inspection, wherein command controls signals for effecting such relative positioning are generated by speaking selected words into a microphone.

Another object is to provide a system and method for effecting automatic image analysis wherein electronic computer assist means is provided to effect such analysis and electronic means is also utilized to generate synthetic speech information for assisting in the image analyzing function by vocally indicating the results of analysis to the operator and informing the operator as to how to continue or improve the analyzing function.

Another object is to provide a system and method for controlling the operation of an inspection apparatus wherein both manual and voice control means are employed in an interacting manner to improve the efficiency of operation of the system by permitting an operator to visually concentrate on an image under 'analysis without requiring the distraction of the operator in selecting and operating manual controls to effect analysis.

Another object is to provide a system and method employing a single electronic computer for effecting the control of an electronic analyzing system and recording means associated therewith for information derived.

With the above and such other objects in view as may hereinafter more fully appear, the invention consists of the the novel constructions, combinations, arrangements of parts and methods as will be more fully described and illustrated in the accompanying drawings but it is to be understood that variations changes and modifications may be resorted to which fall within the scope of the invention as claimed.

BRIEF DESCRIPTION OF THE DRAWING

The drawing shows a schematic diagram of the electronic system employed to define the instant invention wherein, although not illustrated therein, it is assumed that the correct power supplies having correct polarities and magnitudes are provided where not illustrated or indicated, so as to supply proper electrical energy for appropriately operating the various illustrated components, subsystems and circuits as described in the specification.

In FIG. 1 is shown details of a computer controlled image analyzing system employing a plurality of inputs for controlling image generation and analysis, including manually generated input control signals and voice or speech generated control signals.

The system 10 includes a digital computer or electronic microprocessor 11 which is capable of analyzing signals input thereto from a number of source and generating control signals on a plurality of outputs for controlling such operations as the scanning of a television camera, the positioning of a specimen or specimens in the scanning field of the camera, the generation of television images on the display screen of a video display such as a cathode ray tube, the control of one or more displays, the control of analyzing circuits which may be part of the computer or separate therefrom, the control of a synthetic speech signal generator and the other devices to be described.

An operator of the system 10 may manually operate the keys of an encoded keyboard 12 which contains, in addition to coded key switches, a plurality of additional control switches for performing a variety of functions to be described. It is noted that certain of the controls and switching devices illustrated elsewhere in FIG. 1 may be combined in the keyboard 12 for convenient operation by an operator. A plurality of outputs 13 of the keyboard 12 extend to the computer or microprocessor 11 for conducting codes and electrical control signals to the computer for effecting automatic image generation and image analysis.

A television camera 23 has its output lens system 24 operable to scan an image field 22 which may comprise a photograph of a specimen, an actual sample of the specimen, the viewing field of a microscope including an electron microscope, an ultrasonic or X-ray photograph or image filed or any other field in which automatic image analysis is required and which contains detectable variations in image content which will result in variations in the video signal or signals generated on the output of the television camera 23. A support or table 21 is shown as being variably positionable to vary the location of the image field or specimen supported thereby with respect to the scanning axis of the television camera 23 by means of conventional reversible motor driven mechanism contained within subsystems denoted 30 and 32 for respectively positionally controlling the specimen or table 21 in the X-axis and Y-axis directions. The reversible motors defined in the subsystem 30 and 32 are respectively controlled in their operation by suitable electronic drive means 29 and 31 which receive command control signals from the computer 11 in accordance with computations performed therein and inputs to the computer from the keyboard 12 and other sources of information to be described.

The read-beam of the television camera 23 is multi-axis deflection controlled by signals generated on respective outputs of the computer 11, which comprise digital command control signals and which are converted to analog form in respective digital-to-analog converts 27 and 28, the outputs of which are connected to the horizontal sweep generator 25 and the vertical sweep generator 26 which connect to the respective deflection control means of the television camera 23.

A video display 37, preferably in the form of a high resolution image cathode ray tube, contains a display screen 37D on which an image of the field scanned by the television camera 23 is generated by passing the video signal output of the television camera to a transmission gate 39. The output of gate 39 is passed to a video amplifier 41, the output of which amplifier is connected to the image intensity picture signal input 38 of the image generating cathode ray tube 37.

The command signals for controlling the operation of the television camera, the television display and the various image analyzing functions may also be generated by the operator when selected words are spoken by said operator into a microphone 14. The analog speech signals output from the microphone 14 are amplified in an amplifier 15 which is connected to a speech recognition computer or circuit 16 of conventional design and having a plurality of outputs 16A extending to the computer or microprocessor 11. Digital codes representative of the commands spoken into the microphone 14 are generated on such outputs 16A and provide signal information for analysis and used by the computer 11.

The video signal output of the television camera 23 is also connected to an analog-to-digital converter 42 for generating digital signals indicative of the content of the image field scanned by the television camera and such signals are presented, in addition to the computer 11 for analysis, to the input of a transmission gate 43 which is controlled in its operation to transmit either all of or a selected portion of the video signal output from the television camera 24 to a coded switch 47, having a plurality of outputs extending to different signal analyzing circuits denoted 48, 49, 50 and 51 which may be greater in number than the four circuits illustrated and which perform various analyzing functions with respect to the digitized video signal. In other words, a coded command control signal or signals controls the operation of the coded switch 47 to pass all or a portion of the image information generated by the television camera 23 to one of the analyzing circuits 48–51 or to pass all or portions of said video signal to respective of such analyzing circuits.

An oscillator or clock 20 containing a feedback 20F, is employed to generate clock signals for correctly driving and operating the computer or microprocessor 11.

Display of the information gated to the microprocessor 11 from the various analyzing circuits 48–51 is effected when signals indicative of the results of analysis are transmitted from the computer to a decoder-driver circuit 18 which drives an electronic display 19 such as an alpha-numeric digital display, it being noted that such information may also be displayed per se or superimposed over the image information displayed on the display screen 37D of the cathode ray tube 37.

In the event that only a select number of persons are authorized to utilize the image analyzing system 10, a plug-in memory 17 containing recordings of voice signals of persons so authorized and signals defining information which they are authorized to receive or generate in an automatic analysis function, is connected to the speech recognition circuit 16 for automatically controlling and enabling such circuit to generate command control signals for use by the computer 11.

A memory 52, such as a ROM [Read-Only Memory], is provided which is pluggable to the computer 11 which contains information utilizable by the computer as will be described hereinafter. The results of automatic image analysis as well as instructions for the operator of a computer are also provided in the form of synthetic speech generated on the output of a speaker 46 when a synthetic speech synthesizing circuit 45 is automatically controlled in its operation by signals generated by the computer 11. The output of speech synthesizer 45 is passed to an amplifier 45A which is connected to speaker 46. Code signals generated on an output 11C of the computer 11 and derived from speech recognition computer 16 or manual controls may be employed to operate the code switch 60 to gate image signals to be analyzed to selected of the signal analyzing circuits 48–51 of which a greater number may be provided to perform functions as described herein.

An automatic printout of the information generated by the computer is effected by means of an automatic printer 53, such as an ink jet, thermal or impact printer operated by an electronic driver 53D which is connected to receive control signals from computer 11.

Also illustrated in FIG. 1 is alight pen 55 connected to a buffer circuit 56 which pen is utilized to manually scan selected portions of the image filed generated on the display screen 37D of the cathode ray tube 37 and to generate image information resulting from such scanning, which is output from the buffer 56 to the computer 11.

An image signal storage device 54, such as a microelectronic memory, magnetic disc, magnetic tape, magnetic bubble memory or other form of memory, contains inputs thereto from the computer 11 for storing digital image signals and also outputs to the computer for providing digital video signals of stored image information for use by the computer in analyzing and comparing image information generated by the television camera 23. The image signals generated in memory 54 may also be output to the cathode ray tube 37 and displayed on its display screen, in accordance with command control signals generated by the computer 11. A write-enable circuit 11W extends from the computer 11 to the image memory 54 enabling signals passed to the memory to be properly recorded and coded therein so that they are available on demand from the computer 11, when required for comparison or analysis purposes or to generate selected images on the screen of the cathode ray tube 37.

The generation of images on the display screen 37D of the cathode ray tube 37 may be effected, not only by means of full-frame video picture signals generated on the output of television camera 23 and passed through transmission gate 39 but also by digital generated by the computer 11 and derived either from the output of analog-to-digital converter 42 receiving signals from the television camera 23 or from the outputs of digital-to-analog converters 27 and 28 receiving digital video signals from computer 11 and which outputs are passed directly to the horizontal and vertical sweep generating circuits 34 and 33 which connect to the horizontal and vertical deflection control circuits 35 and 36 of the cathode ray tube 37.

The synthetic speech synthesizing and generating computer 44 for generating speech signals of words indicative of the results of quantitative measurements made by the analyzing circuits 48–51, etc. may be made in accordance with the teachings and constructions of speech signals generating circuits and devices made by Texas Instruments Corporations usings their TNC 0280 or other suitable speech signal generating computer which includes, if necessary, suitable digital-to-analog conversion circuits, or speech generating devices made by such companies as Telesensory Systems, Inc., Palo Alto, Calif.; Periphonics, Inc., Bohemia, N.Y.; Interstate Electronics Corporation, Anaheim, Calif.

The speech recognition computer 16 may be made in accordance with the construction of speech recognition circuits and devices as made by Threshold Technology, Inc., Delran, N.J.; Dialong Systems, Inc., Belmont, Mass.; Scott Instruments, Denton, Tex.; Huristics, Inc., Sunnyvale, Calif. and others.

It should be understood with respect to the system illustrated and described above that power supplies having the correct polarities are provided, where not indicated, so as to supply proper electrical energy for appropriately operating the various illustrated circuits, subsystems and components as described in the specification and hereafter in a manner to properly effect performance of the functions described.

The following automatic analyzing functions may be performed with respect to video information passed through coded switch 60 either directly from the analog-to-digital converter 42 connected to the video signal output of the television camera 23 or an output 11B from the computer 11 on which output is generated digital video signals to be automatically analyzed. Such functions may be initiated and controlled or varied by the operator or controller of the system speaking selected key words or a group of such words into microphone 14, the amplified output analog speech signals of which are passed to the speech recognizing circuit or computer 16 which contains suitable digitizing means in the form of one or more analog-to-digital conversion circuits and/or direct speech signal recognizing circuits which generate recognition or control signals on the outputs 16C of the computer 16 which are applied to the microprocessor-computer 11 which thereafter generates signals for automatically controlling one or more of the analyzing and signal generating devices connected to receive signals from the computer 11 such as the television camera 23, the specimen or image field support table or mount 21, the various memories, gates and switches which are operated thereafter to effect the desired image analyzing functions defined by the words spoken into the microphone. Such functions may include:

1. The triggering of the read beam of the TV camera 23 to scan its image field in one sweep thereof.

2. The controlled scanning by the read beam of the TV camera 23 of a selected area or areas of its image field as defined by the word or words spoken into the microphone.

3. The counting of discrete image phonomena such as images of cells, defects, inclusions, bubbles, particles, fibers, synapses and other phenomena.

4. The determination of areas or select image phenomena as defined by information contained in the memory of the microprocessor-computer 11 or a memory connected thereto, which areas are to be selectively scanned to the exclusion of others for the generation of image signals for automatic analysis or comparison with signals contained in memory.

5. The quantitative measurement of a select area as determined by image location, size or shape, color or other variable, in the field scanned.

6. The totallizing or counting of all areas of select size, shape, shade, color or other variable in the image field scanned.

7. The measurement of length of an object in the field scanned, and the selections of such object or image measured.

8. The measurement of the length or width of an object or select area in the field scanned as determined by image size, shape, shade, color or other variable, along a coordinate axis scanned and the selection of such axis along which such measurement is effected.

9. Various length or dimension measurements such as longest or shortest mean chords of select areas or objects displayed, mean linear intercepts, form factors, perimeters and the totallizing of such variables when multiple images are present to be measured.

10. The determination of optical density of a select portion of the image field scanned and displayed or of average optical density of all or a portion of the image field analyzed.

11. Pattern recognition by shape and other geometric, densitometric, color or other criteria and, if required, analysis thereof when recognized as to area, size or other variable, including totallizing of patterns recognized.

12. Controlled movement of the total image field to present selected portions thereof to the display screen for viewing prior to analysis.

13. Voice control of the focus of the TV camera or other device generating the image on the monitor screen.

14. Voice signal control of the television camera focus.

15. Voice signal control of image field orientation.

16. Voice signal control of enlargement of select portions of the image field under analysis.

17. Voice signal control of means for selecting information from memory to be used in automatic quantitative image analysis.

18. Voice signal control of motors operable to vary the scanning axis of the television camera providing the video signals containing the image information to be analyzed.

19. Voice signal control of a recorder containing various image signal recording to be used in image analysis and/or pattern recognition functions defining the automatic analysis operation wherein such control effects the automatic selection from memory or selected of such image signal recordings an their application to generate an image for analysis on an electronic viewing screen such as the display screen 37D of the display cathode ray tube 37.

A variety of other functions and operations associated with the automatic analysis of image information, transient or displayable electrical signals derived from test instruments, transducers and other circuits and desired to be analyzed as to their characteristics to provide intelligible information thereof, may be automatically initiated or varied in accordance with signals generated on the output of a microphone and digitized and automatically analyzed to provide command control signals for effecting such analyzing initiation and control as defined, for example, above wherein one or more read and write beams or other means for sensing image phenomena are predeterminately controlled in their operation in response to specific speech signals generated and analyzing circuits are speech signal selected as described The microprocessor 11 may comprise one of a number of microprocessors manufactured by such companies as Motorola, Texas Instruments, Inc. and Intel Corp. of Santa Clara, Calif. The Intel 8080 microprocessor, for example, will suffice to perform and control the functions described above.

In a modified form of the invention, it is noted that the speech recognition computer or circuitry 16 and the speech synthesizer circuitry 44 may be replaced by a combined speech recognition and synthetic speech generating computer such as the SP-1000 manufactured by the General Instruments Corporation of New York, N.Y.

Additional modified forms of the invention are noted as follows:

20. Light pen 55 may also be constructed and operable for reading coded information, such as printed bar codes provided on sheets or cards or on articles or assemblies to be inspected so as to generate coded electrical signals which are applied to automatically effect certain of the described inspection control functions. Such light pen generated codes may also be employed to control the operation and/or positioning of television camera scanner 23 and/or an automatic manipulator employed to predeterminately effect the controlled movement and positioning of such camera to position it for scanning a select portion or portions of the object or assembly under inspection. Light pen 55 may be supplemented by a bar code scanning light pen for effecting one or more select code generating and automatic control functions as described. The bar codes, when transduced to electrical codes, may also be applied to address image memory 54 through microprocessor 11 to cause it to generate select image information and and apply it as described in the performance of select inspection functions.

21. Television camera 23 may have its scanning axis fixed as shown in the drawing or moveable with respect to the specimen, or object 22 being inspected or specimen holding support 21 therefore. While the latter is operable to be controllably varied in position and may be controllably moved during or between scanning and inspection operations by command control signals applied to the drives 29 and 31 for the X-axis and Y-axis reversible drive motors 30 and 32 permitting scanning to be effected of different portions of an object or specimen, one or more reversible gear motors or the like with electronic drive means therefor may be employed to drive suitable mechanisms operable to cause the television camera 23 to controllably pivot or rotate with respect to the specimen or object and/or otherwise move to vary the field under observation and inspection. Such camera 23 may thus be positioned at a plurality of locations for scanning different portions of the image field or object or different objects or specimens and effect each inspection scanning while the scanning axis is fixed or while the camera is in controlled motion effected and controlled by signals applied to its motor controller(s) or drive(s) through the microprocessor 11 as resproduced from memory 52 and/or any other memory or memories forming part of the microprocessor or connected thereto. Such an auxiliary control signal generator for controlling movement of the camera 23 and/or the positioning device or table 21 may form part of a programmed computer such as computer 11 or another computer connected thereto which operates in response to the signals generating by the signal analyzing circuits 48 to 51 in determining and controlling the degree, speed and direction of movement of the camera 23 and/or table 21 so as to properly control and effect image scanning and automatic image analysis.

Television camera 23 and/or table or fixture 21 may also be controlled in position, movement and rate of travel during scanning by control signals generated on the output of speech signal recognition computer 16 and passed to microprocessor 11 when select words of speech are spoken by an operator into microphone 14. Thus system 10 may be operated by either or both human and computer generated control signals or may have select functions thereof preset or initiated by speaking select words of speech into microphone 14.

22. Image field scanning television camera 23 may also be supplemented with one or more additional television cameras which are operable to scan the same object from different angles or sides thereof and/or different portions of the same image field or different image fields which are process related. All of such multiple television cameras may be controlled in their operations by a single computer or microprocessor 11 to perform scanning functions relating to a single manufacturing or scientific process or function under analysis or inspection. Memory 54 may receive and record the digitized image signals defining the image information generated by said plurality of cameras, each properly coded with an identifying code generated by a code generating circuit associated with each camera to permit such image signals to be discriminated as to the camera from which they were derived. Automatic identification of the specimen or object scanned may also be effected by code signals generated and recorded with the respective image signals recorded in memory 54 when select words of speech are spoken into microphone 14 and recognized by speech recognition computer 16 for controlling suitable code generating electronic circuitry connected to or provided within the microprocessor 11, to generate select codes when so addressed. Such a code generating circuit or computer 57 is shown in the drawing as connected to the computer 11 and may be activated or addressed to generate and output select coded electrical signals to the microprocessor 11 in response to select control or address signals received therefrom as in response to or defining the signals generated on the output of the speech recognition computer 16 when select words of speech are spoken into microphone 14. The code signal generating computer 57 may also be operable to generate time and date indicating code signals whenever it generates a code in response to signals generated by speech recognition computer 16 or in response to select signals generated by computer 16 when select time signal commands are spoken into the microphone 14, 23. Signals generated when select words of speech are spoken into microphone 14 and recognitized by speech recognition computer 16 may also be employed to address video signal memory 54 to cause select image signals recorded therein to be reproduced and applied to the video display 37 for selective visual monitoring of the image information previously recorded and/or analyzed.

24. Code addressable memory 52 contains recorded therein coded control signals for operating the microprocessor or computer 11 in accordance with programmed instructions to permit to to perform such functions as gating select digitized video picture signals output by the television camera 23 to the image signal memory 54 and/or to record the code signals output by the image analyzing circuits 48 to 51 therein for future recall when memory 54 is properly addressed, operation of camera 23, displays 19 and 37 and printer 53 and the other described functions controlled or initiated by signals generated by or passed through computer 11.

Although not illustrated in the drawing, it is assumed that the correct power supplies are provided on the correct sides of all switches, controls, drivers, displays, memories and the other illustrated electrical components and subsystems shown to permit their operation as described above. It is also noted that one or more additional memories, such as random access memories, magnetic tape or optical disc recording and reproduction systems and the like may be provided and connected to the computer 11 to expand the memory capability of system 10 and increase its functional and operational capabilities. Interface and modem means may also be provided suitably connected or coupled to system 10 to permit communication with other displays and workstations as well as similar image analyzing computer systems.

What is claimed is:

1. An automatic image analyzing system comprising:
    (a) first means for generating a video signal containing image information,
    (b) second means for electronically processing and analyzing said video signal in a plurality of ways,
    (c) third means for generating information signals as a result of said electronic analysis by said second means, said information signals being indicative of at least one select characteristic of the image information contained in said video signal,
    (d) microphone means for receiving spoken commands indicative of select analyzing functions to be performed by said second means and for outputting electronic signals,
    (e) fourth means for electronically processing the speech signals output by said microphone means to generate control signals representative of the commands defined by the words spoken into said microphone, and
    (f) fifth means for applying said control signals to control the operation of said second and third means to cause them to process said video signal in a selected way and to generate resulting information signals.

2. An image analyzing system in accordance with claim 1 including sixth means for generating synthetic speech signals indicative of select characteristics of the image information.

3. An image analyzing system in accordance with claim 1 including means for generating a cycle-initiating control signal in response to speaking predetermined speech into said microphone means and applying said control signal to said first means to generate said video signal.

4. An image analyzing system in accordance with claim 1 wherein said first means includes a television camera operable for scanning an image field and generating said video signal.

5. An image analyzing system in accordance with claim 2 including seventh means for causing said sixth means to repeatedly generate synthetic speech signals indicative of select characteristics of the image information analyzed, and speaker means for transducing said synthetic speech signals to select words of speech.

6. An image analyzing system in accordance with claim 5 wherein said seventh means includes a manual switch operable to cause said sixth means to repeat the generation of synthetic speech signals.

7. An image analyzing system in accordance with claim 5 including means for generating a control signal in response to an output of said microphone means and means for applying the control signal to cause said sixth means to repeat the generation of said synthetic speech signals indicative of select characteristics of the image information.

8. An image analyzing system in accordance with claim 1 wherein said first means includes television camera for generating said video signals, and said second means includes analog-to-digital conversion means operable to convert at least a portion of each video signal generated to digital form prior to its analysis by said second means.

9. An image analyzing system in accordance with claim 4 wherein said second means includes an electronic display means for displaying an image field containing information defined by a select video signal generated by said first means, and wherein said signals generated by said third means are operable to select among said image analyzing functions of said second means to analyze the content of the image field displayed.

10. An image analyzing system in accordance with claim 9 including means responsive to control signals generated by said fourth means for controllably moving the camera and the image field relative to each other so as to alter the portion of the image field displayed.

11. An image analyzing system in accordance with claim 1 including means for detecting and counting discrete image phenomena in said image information.

12. An image analyzing system in accordance with claim 9 including means for effecting select image orientation on said display screen.

13. A method for inspecting an image field by the automatic analysis of video signal generated in scanning said image field, comprising:
   (a) speaking select speech into a microphone, to generate electronic signals indicative of respective selected speech commands,
   (b) analyzing the signals output by said microphone to recognize said select speech,
   (c) generating a plurality of control signals in accordance with the recognized speech, and
   (d) applying said control signals
      (i) to effect the scanning of at least a select portion of an image field and to generate a select image on a display screen of a video display, and
      (ii) to effect the selection of at least one of a plurality of image analyzing operations with respect to said video signals to generate signals indicative of the results of such automatic image analysis.

14. A method in accordance with claim 13 including the step of applying said result-indicating signals to cause a visual display to display information indicative of the results of such automatic image analysis.

15. A method in accordance with claim 13 including the step of applying said result-indicating signals to cause a synthetic speech signal generating means to generate select synthetic speech signals, and transducing said select speech signals to select words of speech indicative of the results of said automatic image analysis.

16. A computer controlled system for analyzing and indicating image information, said system comprising:
   (a) first means for generating video signals containing image information to be automatically analyzed,
   (b) second means for electronically processing said video signals and generating coded electrical signals indicative of at least one characteristic of the image information contained in said video signals,
   (c) third means including a speech signal generating means for receiving said coded electrical signals generated by said second means and employing same to generate synthetic speech signals representing speech and
   (d) fourth means for converting said synthetic speech signals to sounds of words of speech indicative of select characteristics of the video signals analyzed by said second means.

17. A computer controlled system in accordance with claim 16 wherein said second means is operable to generate coded electrical signals indicative of a quantitative value of a select characteristic of the image information contained in selected of said video signals.

18. A computer controlled system in accordance with claim 16 wherein said second means is operable to generate coded electrical signals indicative of the presence of select image phenomena in image fields defined by selected of said video signals.

19. A computer controlled system in accordance with claim 16 including a microphone for receiving select speech spoken by a person controlling the operation of said system, a speech signal analyzing circuit operable to receive the speech signals output by said microphone, to analyze same, and to generate control signals, and means for applying said control signals to control the operation of said second means.

20. A computer controlled system in accordance with claim 16 including a microphone for receiving select speech spoken by a person controlling the operation of said system, a speech signal analyzing circuit operable to receive the speech signals output by said microphone, to analyze same, and to generate control signals, and means for applying said control signals to cause said first means to selectively generate video signals.

21. An image analyzing system comprising:
   (a) a television camera for generating video signals containing image information,
   (b) a display screen for displaying said image information,
   (c) means for performing select analyzing functions on said video signals to generate information signals indicative of a select characteristic of the image information contained in said video signals,
   (d) analog-to-digital conversion means effective to convert at least a portion of each said video signal to digital form,
   (e) a microphone for receiving spoken commands indicative of said select analyzing functions,
   (f) means for analyzing said spoken commands to generate corresponding command control signals, and
   (g) means for applying said command control signals to select the analyzing function to be performed on said video signals.

22. A method for inspecting work comprising:
   (a) speaking select speech commands into a microphone, said speech being related to work inspection functions,
   (b) receiving, processing, and computer analyzing the speech signals output by said microphone in response to said spoken commands,
   (c) generating a plurality of command control signals depending on the computer analysis of the spoken commands, and
   (d) applying said command control signals to select among a plurality of different automatic inspection functions including the sensing of at least one select feature of work under inspection and the generating of sensing signals modulated with information relating to said select feature of the work.

23. A method in accordance with claim 22 wherein said command control signals are applied to control the operation of a motor used in the performance of said plurality of different automatic inspection functions.

24. A method in accordance with claim 22 wherein said command control signals are applied to control the operation of a display for displaying information relating to the work inspected.

25. A method in accordance with claim 22 wherein said command control signals are operable to control the operation of an electro-optical scanning means in the performance of said automatic inspection functions.

26. A method in accordance with claim 22 wherein said command control signals are operable to control the operation of a video inspection means operable to scan said work in the performance of said automatic inspection functions.

* * * * *